UNITED STATES PATENT OFFICE.

MATTHEW ATKINSON ADAM, OF LONDON, ENGLAND, AND WILLIAM JAMES FERNIE, OF DROMARA, IRELAND.

RETTING PROCESS.

1,140,296.  Specification of Letters Patent.  Patented May 18, 1915.

No Drawing.   Application filed January 9, 1915.  Serial No. 1,442.

*To all whom it may concern:*

Be it known that we, MATTHEW ATKINSON ADAM, a subject of the King of Great Britain and Ireland, and residing at 57 and 58 Lincoln's Inn Fields, London, W. C., England, and WILLIAM JAMES FERNIE, a subject of the King of Great Britain and Ireland, and residing at Dromara, county Down, Ireland, have invented certain new and useful Improvements in Retting Processes, of which the following is a specification.

This invention relates to the retting of flax straw and like processes of decortication, under the influence of bacteria, of fiber yielding plants and will be more particularly described in relation to the extensively known process of flax retting.

It has long been known that heat promotes the bacterial retting of flax and although many efforts have been made to apply this knowledge, difficulties have been encountered by reason of the low quality of the resultant product. These proposals included the carrying out of the retting at various temperatures, say first at 50° to 60° C., and afterward at 30 to 40° C., or first at a temperature of about 48° C. for one to two hours followed by a lower temperature not less than 35° C. Now as in the processes of retting carried out in such localities as at Courtrai in flowing streams (whence are derived the most valuable products) the temperature seldom exceeds about 25° C. due to the natural summer heat a considerable difference exists between such temperature and those proposed as above indicated for promoting retting.

The object of the invention is to provide a process the latter part of which is carried out at temperatures differing so slightly from the temperatures employed in flowing streams as above indicated as to produce little, if any, deterioration of the product as compared with those processes.

The invention is based upon the discovery that if the principle of using a high initial temperature and a lower finishing temperature be applied under particular conditions, the object indicated can be attained.

We have made our investigations by comparing the result of numerous experiments in which the water in the retting tanks was maintained at about 37° C.—a temperature approximating to blood-heat and the apparent optimum for the bacteria concerned,—during the whole of the retting period, and during portions only, and these experiments, conducted with a dried flax straw grown in the north of Ireland, have shown us that as regards the time occupied in the retting operation, only the heating in the initial stages is material, and that after this preliminary heating more or less normal retting temperatures can be adopted toward the close of the process while at the same time the products both in their color and quality have every appearance of benefiting by the avoidance of the unnecessary heating toward the end of the operation.

As examples of the results obtained as regards time of retting, the following may be quoted:—

1. Flax straw as above referred to retted in gently flowing water (see U. S. A. Patent No. 1083074) at a temperature of 23° C. (within the range of atmospheric retting temperatures) required some 5 days for completion of the operation.

2. The same straw under conditions differing only in that the water was maintained at 37° C. throughout the retting required 2½ days.

3. With the same straw and under the same conditions as 2, except that after 24 hours the temperature of the water was reduced to 23° C. the total time required was still only some 2½ days.

4. In the same way as in 3 the period of heating was in successive experiments cut down without leading to any increase in the time taken for retting until the period of heating had been reduced to some 8 hours when apparently for these conditions the minimum had been attained; any attempt further to reduce the first heating period leading not only to an increase in the total time taken, but apparently bringing it back to the time taken at 1, namely 5 days.

It should be further observed that the commencement of turbidity in the effluent and a little later rapid evolution of gas in the tank seemed to indicate to some extent the positive production of those conditions which it is the object of heating to effect as these in a number of tests invariably occurred in some 7–9 hours and were associated with the completion of retting in some 2½ days.

Upon the basis of the above results it is possible to formulate a working theory, which while not necessarily correct in its details, is borne out practically by numerous experiments (such as the slowing down of the retting to even more than 5 days by draining the tank and allowing entry of air or by too rapid scouring of the tank by fresh water after 8 hours' heating and before cooling to 23° C.) and is of some assistance in dealing with those changes in conditions which may be unavoidable in different circumstances in practice.

It is believed that the retting process is one in which symbiosis plays an important part; the retting organism proper which is an anaerobe only commencing its work under the best conditions when by the reducing agency of one or more other organisms which are aerobes, facultative aerobes or the like and is or are native to the straw or water, and also perhaps by the reducing action of enzyms derived either from the flax straw or from these bacteria or from other source, the proper anaerobic conditions have been established; the function of the heating in these circumstances being to establish rapidly i. e. accelerate, by stimulation of growth by heat, the production of anaerobic conditions after which the heat having played its part can be cut off to prevent its leading to harmful conditions, and moreover to save fuel. It should be observed that the fuel saving effected in this manner is such as may, in many circumstances, make the process, owing to its short total duration, actually more economical in fuel than one where the water is merely heated throughout to a temperature (say 23° C.) intended to reproduce in cool seasons the conditions prevalent in certain places in the height of summer when river retting e. g. at Courtrai.

This invention consists therefore broadly in the method of promoting bacterial retting of flax straw and the like by heat comprising a high temperature stage and a stage in which the latter is at lower temperature substantially that which is a temperature substantially that which is associated with the retting when carried out under atmospheric influences.

This invention further consists in such a method of retting flax in which the straw is immersed for some period between 8 and 24 hours or thereabout, and preferably in the neighborhood of 8 hours only, in water at a temperature in the neighborhood of 37° C., and the operation completed at a temperature of about 20 to 25° C. the operation being preferably carried out as regards arrangement of the straw and flow as indicated in U. S. Patent No. 1083074.

In carrying out the invention in its application to flax, it is convenient to proceed as follows:—The straw is closely packed vertically in tanks which may be simple ferro-concrete tanks. Provision is made as described in U. S. A. Patent No. 1083074 for a slow rate of flow of water vertically through the material from top to bottom. The water is now caused to flow through the tank at a temperature of about 37° C. for about 8–10 hours in the case of dried flax straw grown in the north of Ireland or for such other time as is suggested to be necessary by the time required for production of turbidity in the effluent and rapid evolution of gas (or better still such time as is suggested by previous trial under the conditions imposed) and the supply of water then replaced by one at 23° C. or thereabout and this maintained until the retting is deemed complete when the supply is cut off, the tank drained and the material removed for drying in the usual way.

Having now described our invention what we claim as new and desire to secure by Letters Patent is:—

1. A method of retting flax or the like in which the temperature of the retting water is at first elevated above that during the normal retting and is subsequently during the latter stages of retting lowered to about that at which river retting is normally carried out, as set forth.

2. The method of retting flax or the like in which the temperature of the retting water is maintained at an elevated temperature of about 37° C. during the first part of the retting and is maintained at only about 20 to 25° C. in the second part of the retting, as set forth.

3. The method of retting flax straw consisting in immersing it in flowing water, maintaining the temperature of the water at about 37° C. for less than half the total retting period and lowering the temperature to say 20 to 25° for the remainder of the retting period, as set forth.

4. A method of retting flax straw consisting in immersing flax straw vertically in flowing water constraining the liquid to flow uniformly through the straw in the direction of the length of the straws from above downward, maintaining the temperature of the water at about 37° C. for some 8 hours and thereafter maintaining the temperature of the water at about 20 to 25° C. as set forth.

In testimony whereof we have signed our names to this specification in the presence of two subscribing witnesses.

MATTHEW ATKINSON ADAM.
WILLIAM JAMES FERNIE.

Witnesses to the signature of Matthew Atkinson Adam:
P. A. OUTHWAITE,
J. PHILLIPS CRAWLEY.

Witnesses to the signature of William James Fernie:
L. BROOK,
H. STAFFORD.